United States Patent
Harper et al.

(10) Patent No.: US 7,021,243 B2
(45) Date of Patent: Apr. 4, 2006

(54) PET SHELTER WITH SELF-INTERLOCKING COMPONENTS

(75) Inventors: Mike Harper, Fort Worth, TX (US); Charles Schmucker, Allen, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 49 days.

(21) Appl. No.: 10/801,804

(22) Filed: Mar. 16, 2004

(65) Prior Publication Data

US 2005/0217598 A1 Oct. 6, 2005

(51) Int. Cl.
*A01K 1/03* (2006.01)
(52) U.S. Cl. .................................... 119/498; D30/108
(58) Field of Classification Search ............... 119/435, 119/452, 472, 474, 482, 491, 498, 499; D30/117, D30/118
See application file for complete search history.

(56) References Cited

U.S. PATENT DOCUMENTS

| | | | | |
|---|---|---|---|---|
| D360,709 S | * | 7/1995 | Northrop et al. | .......... D30/108 |
| 5,551,371 A | * | 9/1996 | Markey et al. | ............. 119/499 |
| 5,713,302 A | * | 2/1998 | Walter | ......................... 119/165 |
| D467,041 S | * | 12/2002 | Cortes-Reuter | ............ D30/109 |
| 6,539,895 B1 | * | 4/2003 | Hoagland | .................... 119/453 |
| D496,501 S | * | 9/2004 | Walter et al. | .............. D30/161 |

OTHER PUBLICATIONS

Doskocil Manufacturing Company, "Petmate Baux'R Assembly Instructions,".

\* cited by examiner

*Primary Examiner*—Teri Pham Luu
*Assistant Examiner*—Susan C. Alimenti
(74) *Attorney, Agent, or Firm*—Locke Liddell & Sapp LLP

(57) ABSTRACT

A pet shelter includes a bottom member having an edge, a top member having an edge, and a medial member disposed between the top and bottom members. The medial member has a top edge and a bottom edge. The pet shelter includes a lock for selectively interconnecting the bottom member to the bottom edge of the medial member and a lock for selectively interconnecting the top member to the top edge of the medial member. The lock includes a tab disposed in the bottom edge of the medial member and a tab disposed in the edge of the top member. The bottom member includes an aperture for receiving the medial member tab to thereby selectively lock the bottom member to the medial member. The medial member includes an aperture for receiving the top member tab to thereby selectively lock the top member to the medial member.

1 Claim, 3 Drawing Sheets

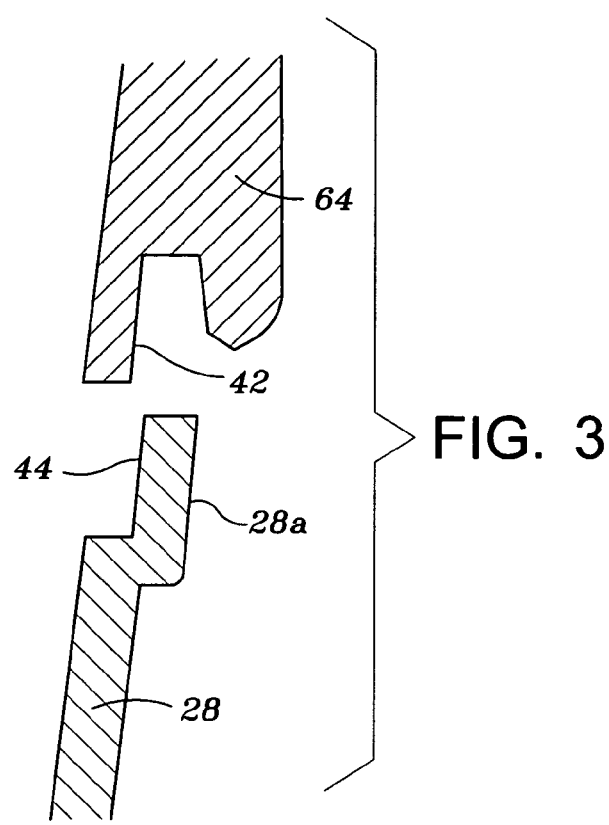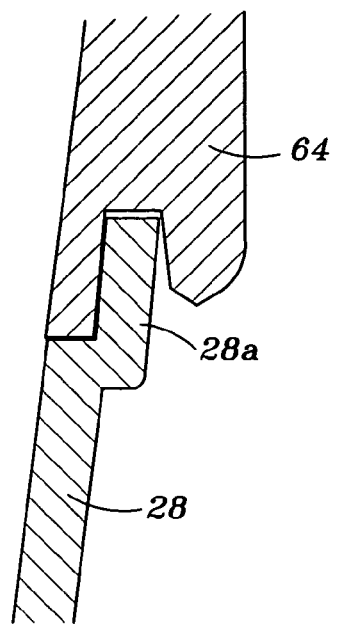
FIG. 3
FIG. 3A
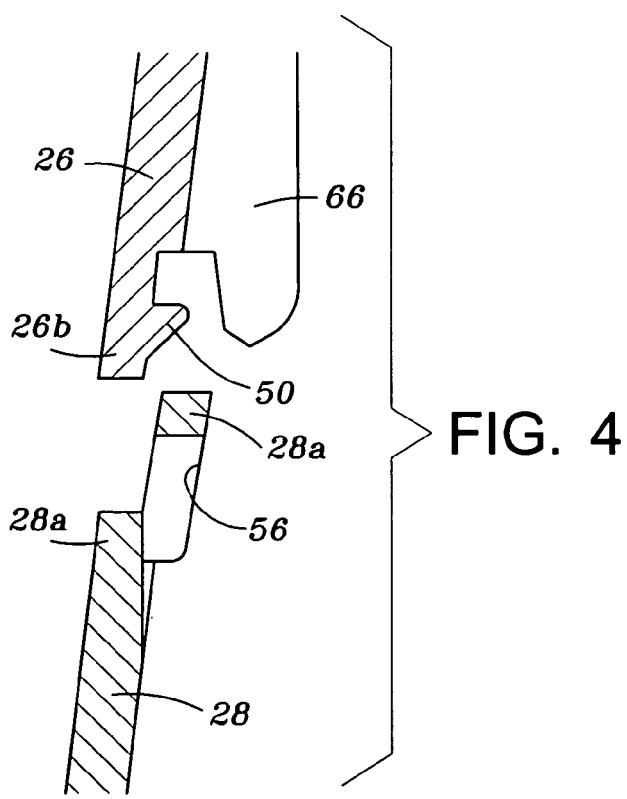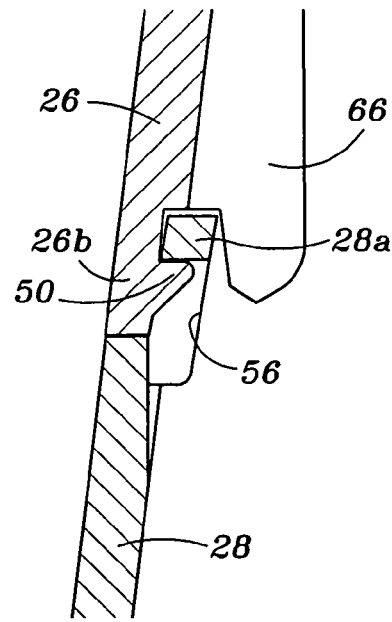
FIG. 4
FIG. 4A

PET SHELTER WITH SELF-INTERLOCKING COMPONENTS

TECHNICAL FIELD OF THE INVENTION

The present invention relates to pet shelters, and more particularly to a pet shelter having self-interlocking components for ease of set-up, portability and storage.

BACKGROUND OF THE INVENTION

Various enclosures for pets are available to provide shelter for pets from weather and to allow pet owners to contain their pets. Many of these enclosures are burdensome to set-up and require the use of multiple fasteners such as, for example, nuts, bolts and screws to assemble multiple components of a pet shelter. Consumers may desire to disassemble a pet shelter for transport and/or storage when not in use. As a result, various pet shelters have been devised which are manufactured with multiple components for disassembly and for storage in a compact area. However, many such disassemblable pet shelters are difficult to configure between the assembled and storage positions, requiring numerous fasteners and tools to assemble a pet shelter.

A need has thus arisen for a pet shelter that is easy to assemble for use and disassemble for storage.

SUMMARY OF THE INVENTION

In accordance with the present invention, a pet shelter is provided. The pet shelter includes a bottom member having an edge, a top member having an edge, and a medial member disposed between the top and bottom members. The medial member has a top edge and a bottom edge. The pet shelter includes a lock for selectively interconnecting the bottom member to the bottom edge of the medial member and a lock for selectively interconnecting the top member to the top edge of the medial member. The lock includes a tab disposed in the bottom edge of the medial member and a tab disposed in the edge of the top member. The bottom member includes an aperture for receiving the medial member tab to thereby selectively lock the bottom member to the medial member. The medial member includes an aperture for receiving the top member tab to thereby selectively lock the top member to the medial member.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 3 is an exploded view of a cross-sectional view taken generally along section lines 3A—3A of FIG. 1A;

FIG. 3A is a cross-sectional view taken generally along sectional lines 3A—3A of FIG. 1A;

FIG. 4 is an exploded view of a cross-sectional view taken generally along section lines 4A—4A of FIG. 1A; and FIG. 4A is a cross-sectional view taken generally along sectional lines 4A—4A of FIG. 1A.

DESCRIPTION OF THE PREFERRED EMBODIMENTS

Figure 1:
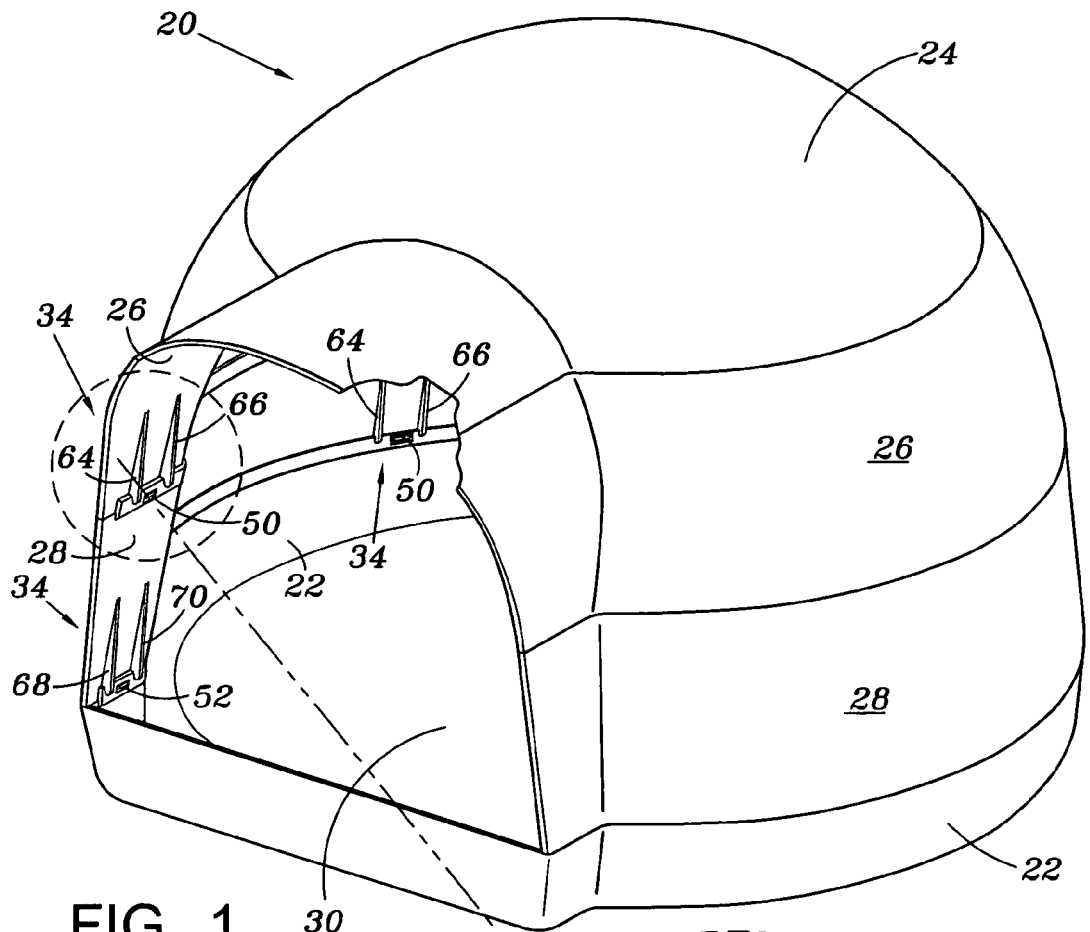
FIG. 1 is a front perspective view of the present pet shelter.

Referring simultaneously to FIGS. 1–4, the present pet shelter is illustrated and is generally identified by the numeral 20. Although the present pet shelter 20 is illustrated having the form of an igloo, the present invention is utilized with any shaped pet shelter, such as, for example, square or rectangular wherein multiple sections are assemblable to complete a pet shelter. Pet shelter 20 includes a bottom member 22, a top member 24 and medial members 26 and 28, disposed between top member 24 and bottom member 22. Although two medial members 26 and 28 are illustrated, the present invention may utilize a single medial member, or more than two medial members, depending upon the size and configuration of pet shelter 20.

Pet shelter 20 also includes an access door 30.

Figure 1A:
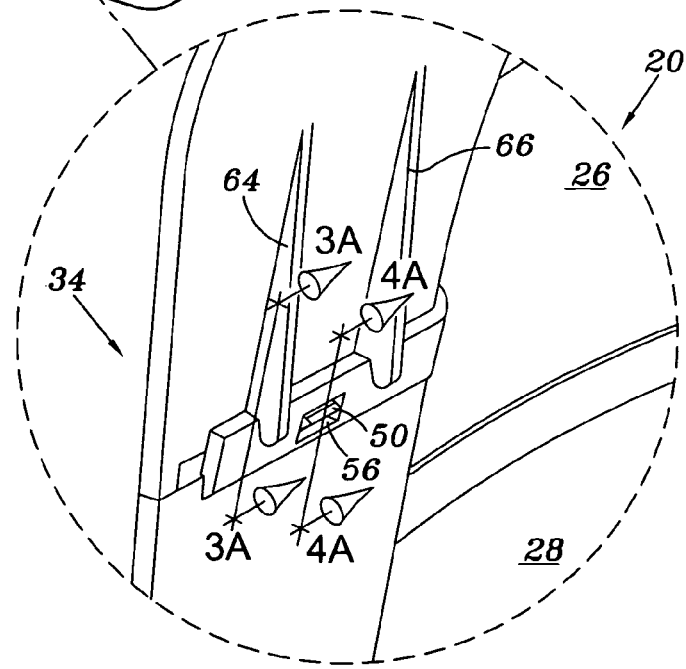
FIG. 1A is an enlarged view of a portion of the pet shelter shown in FIG. 1 illustrating the present lock.
Figure 2:
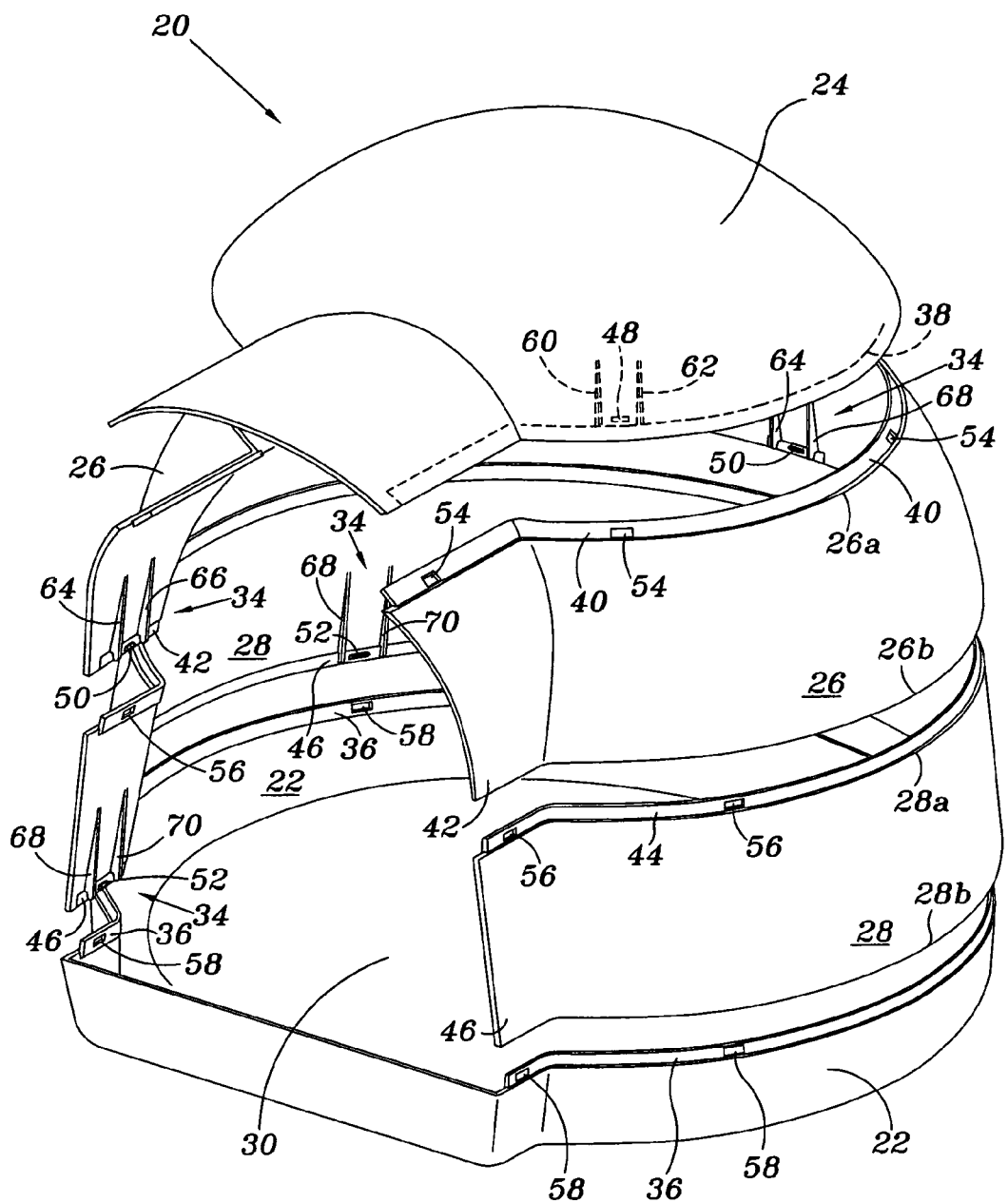
FIG. 2 is an exploded front perspective view of the pet shelter illustrated in FIG. 1.

In accordance with the present invention, bottom member 22, top member 24 and medial members 26 and 28 are easily assemblable without the need of separate fasteners, thereby eliminating the need for tools in assembling pet shelter 20. Medial member 28 is assembled to bottom member 22, medial member 26 is assembled to medial member 28, and top member 24 is assembled to medial member 26 utilizing a plurality of locks, generally identified by the numeral 34 (FIG. 1A). Locks 34 are disposed around the periphery of members 22, 24, 26, and 28 to selectively attach and permit disassembly of members 22, 24, 26, and 28 without the need for separate fasteners.

Disposed around the circumference of bottom member 22 is an area of reduced thickness comprising an interface lip 36. Disposed around the circumference of top member 24 is an area of reduced thickness, comprising an interface lip 38. Medial member 26 includes a top edge 26a and a bottom edge 26b. Disposed around the circumference of medial member 26 at top edge 26a is an area of reduced thickness, comprising an interface lip 40. Disposed around the circumference of medial member 26 adjacent bottom edge 26b is an area of reduced thickness, comprising an interface lip 42. Medial member 28 includes a top edge 28a and a bottom edge 28b. Circumferentially disposed around top edge 28a of medial member 28 is an area of reduced thickness, comprising an interface lip 44. Circumferentially disposed around bottom edge 28b of medial member 28 is an area of reduced thickness, comprising an interface lip 46. When pet shelter 20 is in the assembled position, lip 38 overlaps lip 40, lip 42 overlaps lip 44, and lip 46 overlaps lip 36. This configuration provides a pet shelter that is resistant to wind and prevents rain from entering the interior of pet shelter 20 between the members 22, 24, 26, and 28.

Locks 34 include a plurality of tabs 48 disposed circumferentially around lip 38 of top member 24, a plurality of tabs 50 circumferentially disposed around lip 42 of medial member 26 and a plurality of tabs 52 circumferentially disposed around lip 46 of medial member 28.

Locks 34 further include a plurality of apertures 54 circumferentially disposed around lip 40 of medial member 26. Apertures 54 are aligned with tabs 48 of top member 24 to receive and lock tabs 48, thereby selectively attaching top member 24 to medial member 26. Similarly, circumferentially disposed around lip 44 or medial member 28 are a plurality of apertures 56. Apertures 56 align with tabs 50 to receive and lock tabs 50 to thereby selectively attach medial member 26 to medial member 28. Circumferentially disposed around lip 36 of bottom member 22 are a plurality of apertures 58. Apertures 58 are aligned with tabs 52 to receive and lock tabs 52 thereby selectively attaching medial member 28 to bottom member 22. Tabs 48, 50, and 52 are insertable into apertures 54, 56, and 58, respectively without the use of tools, thereby easily assembling members 22, 24, 26, and 28.

Disposed adjacent each tab 48 and spaced apart from lip 38 of top member 24 are back up ribs 60 and 62. Back up ribs 60 and 62 engage the area adjacent apertures 54 when top member 24 is assembled to medial member 26 to thereby complete the locking function provided by locks 34. In a similar manner, disposed adjacent tabs 50 and extending from and spaced apart from lip 42 of medial member 26 are ribs 64 and 66. Ribs 64 and 66 engage the area adjacent apertures 56 of medial member 28 when medial members 26 and 28 are assembled. Disposed adjacent tabs 52 and extending from and spaced apart from lip 46 are ribs 68 and 70. Ribs 68 and 70 engage the area adjacent to apertures 58 of base member 22 when medial member 28 is assembled to base member 22. Ribs 60–70 exert an outwardly directed force to maintain members 22, 24, 26, and 28 in a locked position when assembled.

Other alteration and modification of the invention will likewise become apparent to those of ordinary skill in the art upon reading the present disclosure, and it is intended that the scope of the invention disclosed herein be limited only by the broadest interpretation of the appended claims to which the inventor is legally entitled.

We claim:

1. A pet shelter comprising:
   a bottom member having an interior side wall, an exterior side wall and an edge including an interface lip;
   a top member having an interior side wall, an exterior side wall and an edge including an interface lip;
   a medial member having an interior side wall, and an exterior side wall and disposed between said top member and said bottom member, said medial member having a top edge including an interface lip and a bottom edge including an interface lip and being selectively attachable to said top member and to said bottom member in an assembled position of the shelter;
   a lock for selectively interconnecting said bottom member to said bottom edge of said medial member and for selectively interconnecting and said top member to said top edge of said medial member;
   said lock including a tab disposed on said interior side wall of said top member adjacent to said top member interface lip and a tab disposed on said interior side wall of said medial member adjacent to said medial member bottom edge interface lip,
   said medial member top edge interface lip including an aperture for receiving said top member tab to thereby selectively lock said top member to said medial member and such that said top member interface lip overlaps said medial member top edge interface lip to create a continuous exterior surface between said top member exterior side wall and said medial member exterior side wall; and
   said bottom member interface lip including an aperture for receiving said medial member tab to thereby selectively lock said bottom member to said medial member and such that said medial member bottom edge interface lip overlaps said bottom member interface lip to create a continuous exterior surface between said medial member exterior side wall and said bottom member exterior side wall, and further including;
   first and second ribs disposed on said interior side wall of said medial member and adjacent said medial member tab and third and fourth ribs disposed on said interior side wall of said top member and adjacent said top member tab, said first and second ribs being disposed adjacent said bottom member interface lip aperture and said third and fourth ribs being disposed adjacent said medial member top edge interface lip aperture when said members are in the assembled position of the shelter.

* * * * *